(12) United States Patent
Beltrand

(10) Patent No.: US 9,694,903 B2
(45) Date of Patent: Jul. 4, 2017

(54) SECURE AIRCRAFT-BASED MOBILE DEVICE CONNECTIVITY SYSTEMS AND METHODS

(71) Applicant: AIRBUS OPERATIONS (SAS), Toulouse (FR)

(72) Inventor: François Beltrand, Villeneuve Tolosane (FR)

(73) Assignee: Airbus Operations (SAS), Toulouse (FR)

( * ) Notice: Subject to any disclaimer, the term of this patent is extended or adjusted under 35 U.S.C. 154(b) by 169 days.

(21) Appl. No.: 13/928,882

(22) Filed: Jun. 27, 2013

(65) Prior Publication Data

US 2015/0005989 A1 Jan. 1, 2015

(51) Int. Cl.
*B64C 19/00* (2006.01)
*H04L 29/06* (2006.01)
(Continued)

(52) U.S. Cl.
CPC ......... *B64C 19/00* (2013.01); *H04B 7/18506* (2013.01); *H04L 63/0209* (2013.01); *H04L 63/105* (2013.01); *H04L 67/12* (2013.01)

(58) Field of Classification Search
CPC ... H04W 12/08; H04W 88/00–88/185; H04W 84/06; G06F 15/173–15/17393; G06F 1/1613–1/1698; H04L 63/105; H04L 63/20–63/205; H04L 67/12–67/125; H04L 63/0209–63/0218; B64C 19/00; H04B 7/18506–7/18508
(Continued)

(56) References Cited

U.S. PATENT DOCUMENTS 6,915,189 B2   7/2005  Igloi et al.
7,489,992 B2   2/2009  Valette et al.
(Continued)

FOREIGN PATENT DOCUMENTS

| EP | 1280316 A2 | 1/2003 |
| EP | 2031833 A2 | 3/2009 |
| WO | 2013013243 A1 | 1/2013 |

OTHER PUBLICATIONS

"Aircraft Data Network Part 5 Network Domain Characteristics and Interconnection"; Aeronautical Radio, Inc; ARINC Specification 664P5; Published Apr. 12, 2005.*
(Continued)

*Primary Examiner* — Linglan Edwards
*Assistant Examiner* — Kevin Bechtel
(74) *Attorney, Agent, or Firm* — Lorenz & Kopf, LLP

(57) ABSTRACT

An aircraft-based mobile device connectivity system generally includes a housing, an avionic systems interface integrated into the housing, a wireless interface integrated into the housing, and a data security module. The avionic system interface is configured to be communicatively coupled to an avionics system external to the housing. The wireless interface is configured to provide wireless communication with one or more mobile devices. The data security module is configured to receive commands from the mobile devices, securely process the commands, receive avionics data from the avionics system via the avionic systems interface and the avionics module, and securely transmit the avionics data to the mobile devices.

6 Claims, 14 Drawing Sheets

(51) Int. Cl.
*H04L 29/08* (2006.01)
*H04B 7/185* (2006.01)

(58) Field of Classification Search
USPC .......................... 726/4, 11–15, 17; 709/225
See application file for complete search history.

(56) References Cited

U.S. PATENT DOCUMENTS

| | | | |
|---|---|---|---|
| 7,636,568 B2 | 12/2009 | Gould et al. | |
| 7,835,734 B2 | 11/2010 | Eckert et al. | |
| 7,908,053 B2 | 3/2011 | McGuffin et al. | |
| 7,949,335 B2 | 5/2011 | Stefani et al. | |
| 8,108,095 B2 | 1/2012 | McGuffin et al. | |
| 2004/0204801 A1 | 10/2004 | Steenberge et al. | |
| 2007/0127460 A1* | 6/2007 | Wilber et al. | 370/389 |
| 2007/0168536 A1* | 7/2007 | Machulsky | H04L 69/161 |
| | | | 709/230 |
| 2010/0189089 A1* | 7/2010 | Lynch | H04W 84/005 |
| | | | 370/338 |
| 2012/0265372 A1 | 10/2012 | Hedrick | |
| 2015/0019862 A1* | 1/2015 | Uczekaj | H04L 67/12 |
| | | | 713/155 |

OTHER PUBLICATIONS

ARINC Specification 664p5. "Aircraft Data Network Part 5 Network Domain Characteristics and Interconnection", published Apr. 12, 2005.*

European Patent Office, European Search Report for European Application No. 14172643.0 mailed Mar. 16, 2015.

ARINC, Aircraft Data Network Part 5 Network Domain Characteristics and Interconnection, ARINC Specification 664P5, Apr. 12, 2005.

Airlines Electronic Engineering Committee, "Commercial Aircraft Information Security Concepts of Operation and Process Framework," ARINC Report 811, published Dec. 20, 2005, pp. 1-134, published by Aeronautical Radio, Inc., Annapolis, Maryland.

* cited by examiner

SECURE AIRCRAFT-BASED MOBILE DEVICE CONNECTIVITY SYSTEMS AND METHODS

TECHNICAL FIELD

The technical field generally relates to aircraft-based information systems and data communication. More particularly, the technical field relates to mobile device communications in the context of such information systems.

BACKGROUND

Modern aircraft often incorporate sophisticated data communication networks requiring multiple levels of information security. For example, Aeronautical Radio, Incorporated (ARINC®) promulgates the ARINC 811 standard, entitled "Commercial Aircraft Information Security Concepts of Operation and Process Framework" (referred to herein as "ARINC 811").

In general, ARINC 811 provides an aircraft information security process framework relating to airline operational needs, and specifies four domains: (1) Aircraft Control Domain-Avionics (ACD-AV); (2) Aircraft Control Domain-System Information (ACD-IS); (3) Airline System Information Domain (AISD); and (4) Passenger Domain (PIESD). Each of these domains require different levels of protection. The ACD-AV domain, for example, which deals with flight commands, flight systems, etc., requires very high level of protection. The ACD-IS domain, which comprehends the interface between the avionics and the outside world, also requires a very high level of protection. The AISD domain, in contrast, is a fairly open domain that deals with both technical and commercial operation details often accessed by the pilot and others.

Currently known architectures used within the AISD domain are unsatisfactory in a number of respects. For example, the various components of such architectures (e.g., docking stations, routers, servers, and the like) do not typically provide an easy way to provide wireless connectivity to laptop computers, tablet computers, and other such mobile devices. Furthermore, known systems tend to include components that are directly integrated into the aircraft, and thus are not amenable to easy customization. In addition, such systems tend to be heavy and take up a substantial amount of space. Finally, known systems often use proprietary protocols and/or interfaces, and are thus not compatible with conventional mobile devices, which have become increasingly popular.

Accordingly, there is a need for improved systems and methods for providing mobile device connectivity the context of airborne data communication networks.

BRIEF DESCRIPTION OF DRAWINGS

The present disclosure will hereinafter be described in conjunction with the appended drawings, where like designations denote like elements, and.

DETAILED DESCRIPTION

The following detailed description presents a number of embodiments and is not intended to limit the present disclosure or the application and uses of the teachings of the present disclosure. Furthermore, there is no intention to be bound by any expressed or implied theory presented in the preceding technical field, background, brief summary, or the following detailed description. In the interest of brevity, conventional systems and methods relating to aircraft structure, aircraft communication systems, aircraft-related standards, and the like need not be described in detail herein.

Figure 1:
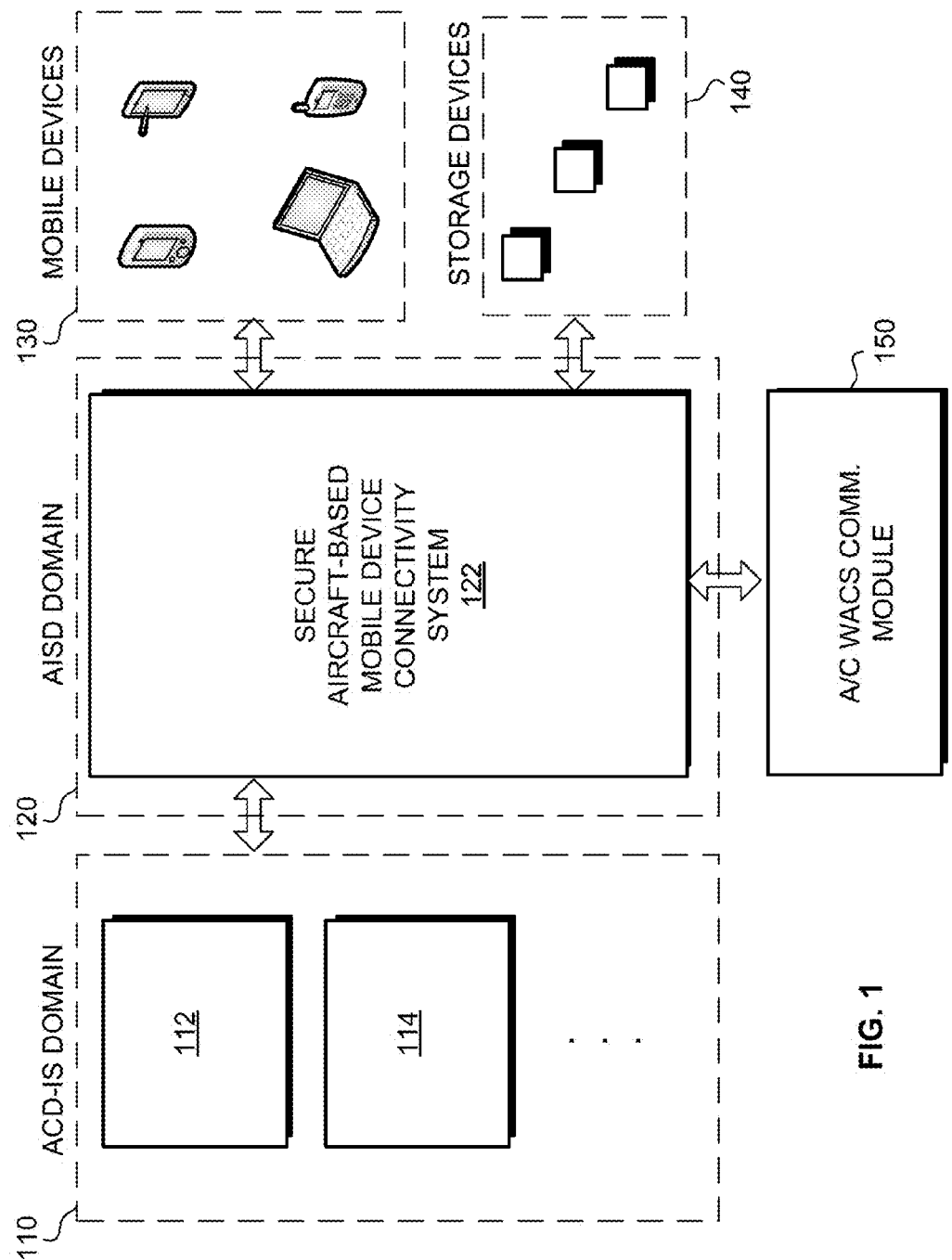
FIG. 1 is a conceptual block diagram depicting an aircraft-based communication system according to various embodiments.

In general, the systems and methods described herein provide a compact, easy-to-use, and secure aircraft-based connectivity solution for conventional mobile devices. In this regard, FIG. 1 presents a conceptual block diagram of an aircraft-based communication system according to various embodiments. As shown, the system is characterized by an ACD-IS Domain 110, which will typically include any number of functional modules 112 (e.g., avionics and flight control), and an AISD Domain 120, including a secure aircraft-based mobile device connectivity system (or simply "system" 122). System 122 is configured to be communicatively coupled (via various interfaces and protocols, as described in detail below) to one or more mobile devices 130, one or more storage devices 140, and a Wireless Airport Communication System (WACS) communication module 150.

As a preliminary matter, while the ARINC 811 standard and its various domains are often used as examples herein, the present teachings are not so limited, and may be implemented in the context of any multiple-domain aircraft-based data communication framework. It is not limited to those conforming to the ARINC 811 standard. Similarly the use of the terms Aircraft Control Domain-Avionics (ACD-AV), Aircraft Control Domain-System Information (ACD-IS), Airline System Information Domain (AISD), and Passenger Domain (PIESD) are not intended to be limiting. In this regard, the nature and purpose of the various ARINC 811 domains are well known in the art, and need not be described in detail herein.

With continued reference to FIG. 1, mobile devices 130 include any of the various devices now known or later developed for accessing and sharing information via wireless data connections. Such devices include, but are not limited to, laptop and netbook computers, tablet computers, smart-phones, personal data assistants, electronic flight-bag (EFB) devices, mobile maintenance devices, and the like. Such devices may be used by pilots, for example, to access avionics information and other aircraft data during a flight.

Storage devices 140 include any of the various data storage devices now known or later developed, including, for example, Universal Serial Bus (USB) flash drives, SD and/or micro-SD cards, standard hard drives, solid state drives (SSD), and the like. WACS communication module 150 is configured to provide wireless airport communication, as is known in the art.

Figure 2:
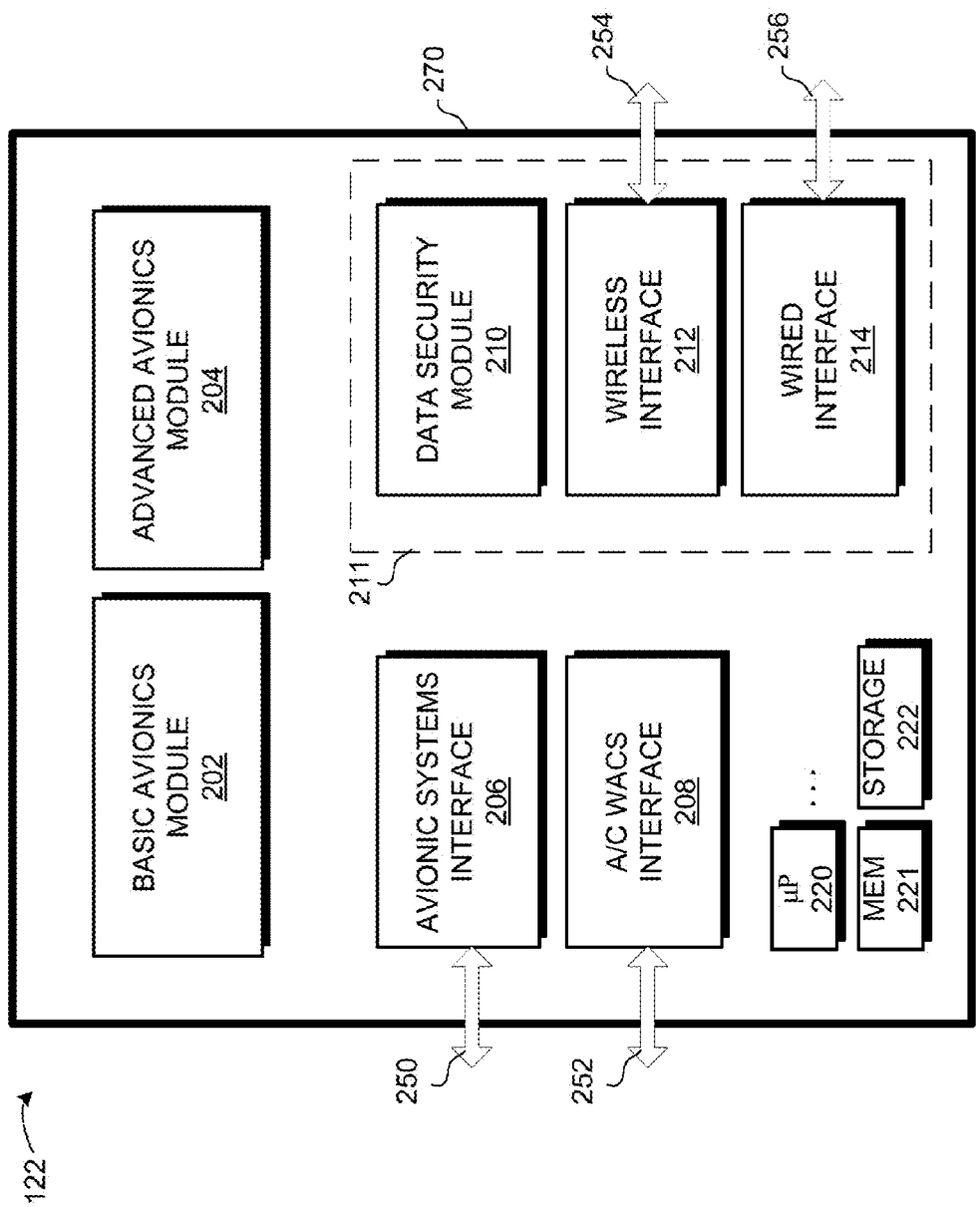
FIG. 2 is a conceptual block diagram of an example secure aircraft-based mobile device connectivity system depicted in FIG. 1.

Referring now to FIG. 2 in conjunction with FIG. 1, in general, system 122 includes a basic avionics module 202, an advanced avionics module 204, an avionic systems interface 206, and an aircraft ("A/C") WACS interface 208. System 122 further includes, within a secure module 211, a data security module 210, a wireless interface 212, and wired interface 214. As is typically included in such systems, system 122 includes one or more processors 220 (e.g., single core or multi-core Central Processing Units (CPUs) and/or Graphics Processing Units (GPUs), one or more forms of memory 221 (e.g., SDRAM), and one or more types of storage 220 (e.g., convention hard-disks, solid-state drives, etc.)

The various functional modules and interfaces depicted in FIG. 2 may be implemented using any combination of hardware and software. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 3:
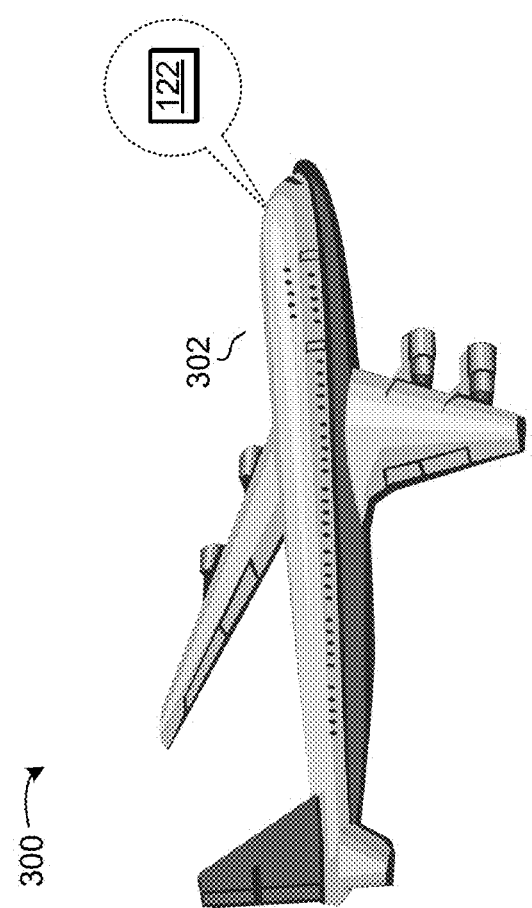
FIG. 3 is a conceptual diagram depicting the use, in an aircraft, of a secure aircraft-based mobile device connectivity system as shown in FIG. 2.
Figure 4:
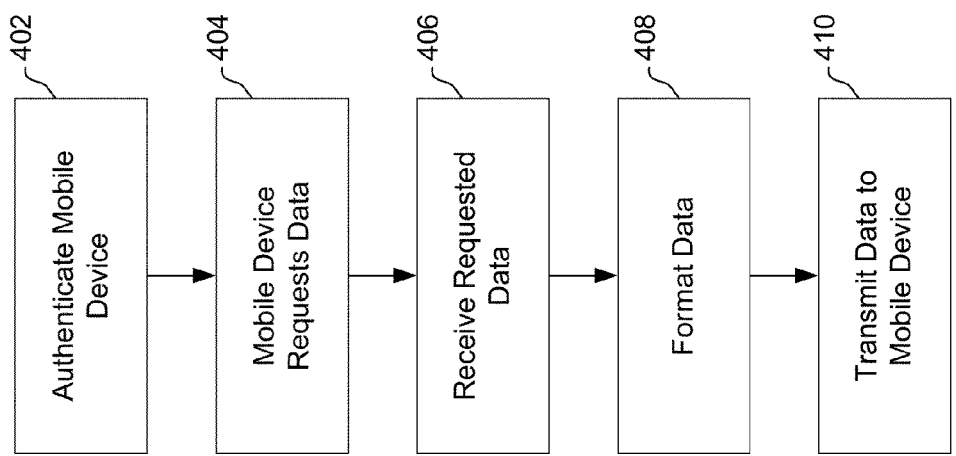
FIG. 4 is a flowchart depicting a method in accordance with various embodiments.

Furthermore, the illustrated modules and interfaces may be integrated into a single housing 270 (e.g., a housing that is separate from and non-contiguous with the housings, if any, used for the other components depicted in FIG. 1), or may be distributed among multiple housings. In one embodiment, for example, the modules and interfaces within system 122 are incorporated into (or integrated into) a single, compact housing that allows system 122 to be easily relocated and coupled to the appropriate receptacles of an aircraft cockpit, including, but not limited to USB, Ethernet, or the like). With brief reference to FIG. 3, for example, system 122 is preferably compact, light, and installed within a cockpit 302 of an aircraft 300.

In one embodiment, system 122 conforms to ARINC 404 (dealing with installation, wiring databases, and data buses), ARINC 600 (dealing with avionics modularization), and MIL-STD-155 (dealing with various characteristics of serial data buses). The present teachings are not so limited, however, and may be used in connection with any form of aircraft, including, but not limited to, spacecraft, rotorcraft, etc., in which information regarding avionics and the like is to be communicated between components.

With continued reference to FIG. 2, basic avionics module 202 is configured provide what might be considered standard and traditional avionics functionality, while advanced avionics module 204 is configured to provide more advanced functionality. For example, in one embodiment, basic avionics module 202 provides data-loading, customization, configuration, health monitoring of WACS communication module 150, and communication with built-in test equipment (BITE) consistent with, for example, ARINC 615A and ARINC 665. Advanced avionics module 204, on the other hand, is configured in one embodiment to communicate avionic parameters (speed, altitude, flight phase, etc.) to connected mobile devices 130, provide message exchange with modules 112 within ACD-IS domain 110, provide direct IP communication with connected mobile devices, and provide an administration function from external devices. Modules 202 and 204 may, of course, be integrated into a single functional module.

Avionic systems interface 206 is configured to communicate with ACD-IS domain 110 (and or an ACD-AV domain, not illustrated) through communication channel 250. In accordance with one embodiment, avionic systems interface 206 and communication channel 250 are configured to implement standard Ethernet communication via an ARINC 429 protocol; however, other communication channels and interfaces may be employed.

A/C WACS interface (or simply "WACS interface") 208 is configured to communicate with WACS communication module 150 via communication channel 252. In accordance with convention WACS communication, in one embodiment WACS interface 208 and communication channel 252 are configured to implement standard Ethernet communication.

Wireless interface 212 is configured to communicate with mobile devices 130 via a wireless communication channel 254. A variety of components (such as conventional access points, radio modules, etc.), protocols, and physical connections may be used by wireless interface 212 and communication channel 254 to effect communication with the mobile devices. Such protocols and data communication methods include, for example, IEEE 802.11 (WiFi®), Bluetooth®, File Transfer Protocol (FTP), Hypertext Transfer Protocol (HTTP), Simple Mail Transfer Protocol (SMTP), Common Unix Printing System (CUPS), and any other wireless communication method now known or later developed.

Wired interface 214 is configured to communicate with various systems (such as storage devices 140) via a wired communication channel 256 (which might include multiple physical connections). Communication channel 256 might include, for example, one or more of a USB connection, a Firewire connection, an Ethernet connection, or the like.

Data security module 210 is configured to provide firewall or "DMZ" (de-militarized zone) functionality between mobile devices 130 and the various subcomponents of system 122 (and, by extension, ACS-IS Domain 110). Thus, security module 210, wireless interface 212, and wired interface 214 fall within a defined secure region 211, allowing, for example, safe communication of data commands, and requests from mobile devices 130, through wireless interface 212, to other components of system 122. Referring now to the flowchart shown in FIG. 5, data security module 210 will typically provide access rights management with respect to mobile devices 130, which will go through an authentication procedure (e.g., a login/password) prior to establishing a session with system 122 (Step 402). In one embodiment, at the time of authentication, system 122 allocates an IP address to the mobile device 130, which is then suitably stored within mobile device 130. Next, system 122 will typically receive some form of request from a mobile device—e.g., a request for data (such as avionics data) (Step 404). Subsequently, system 122 receives data (e.g., via a ARINC 429 or Ethernet cable) from ACD-IS domain 110, WACS communication module 150, or the like (Step 406), which then transforms the data into a format readable by the mobile device 130 (Step 408). The data is then sent via interface 212 and communication channel 254 to the appropriate mobile device(s) 130 (Step 410).

System 122 may be further configured to communicate with external systems using various methods. In one embodiment, system 122 is communicatively coupled with one or more antennas on the fuselage of the aircraft to provide GATELINK access to the Internet (and/or other networks) when the aircraft is on the ground, and SATCOM access to the Internet (and/or other networks) when the aircraft is in flight.

Additional security is provided by system 122 in a number of ways—for example, by segregating secure region 211 from the rest of system 122 (and ACD-IS domain 110). This segregation may be provided via hardware or software, or a combination thereof. In the case of hardware segregation, separate physical processors are used. For example, referring to FIG. 2, system 122 might include multiple processors 220. In such a case, when the processor 220 associated with secure region 211 becomes non-functional, its connectivity with the other processor is severed. In the case of software segregation, a single processor (with multiple cores) is used in conjunction with suitable security software that manages communication between the cores.

The systems and methods described above may be implemented in a variety of ways and in many types of aircraft. Without loss of generality, a number of example architectures will now be presented in conjunction with FIGS. 5-12. More particularly, four examples will be presented in the context of a first aircraft type, and four examples will be presented in the context of an a second aircraft type. It will be understood, however, that the present invention is not so limited. Furthermore, in the interest of brevity, certain well known features and characteristics of the aircraft will not be described herein.

Example 1

Figure 5:
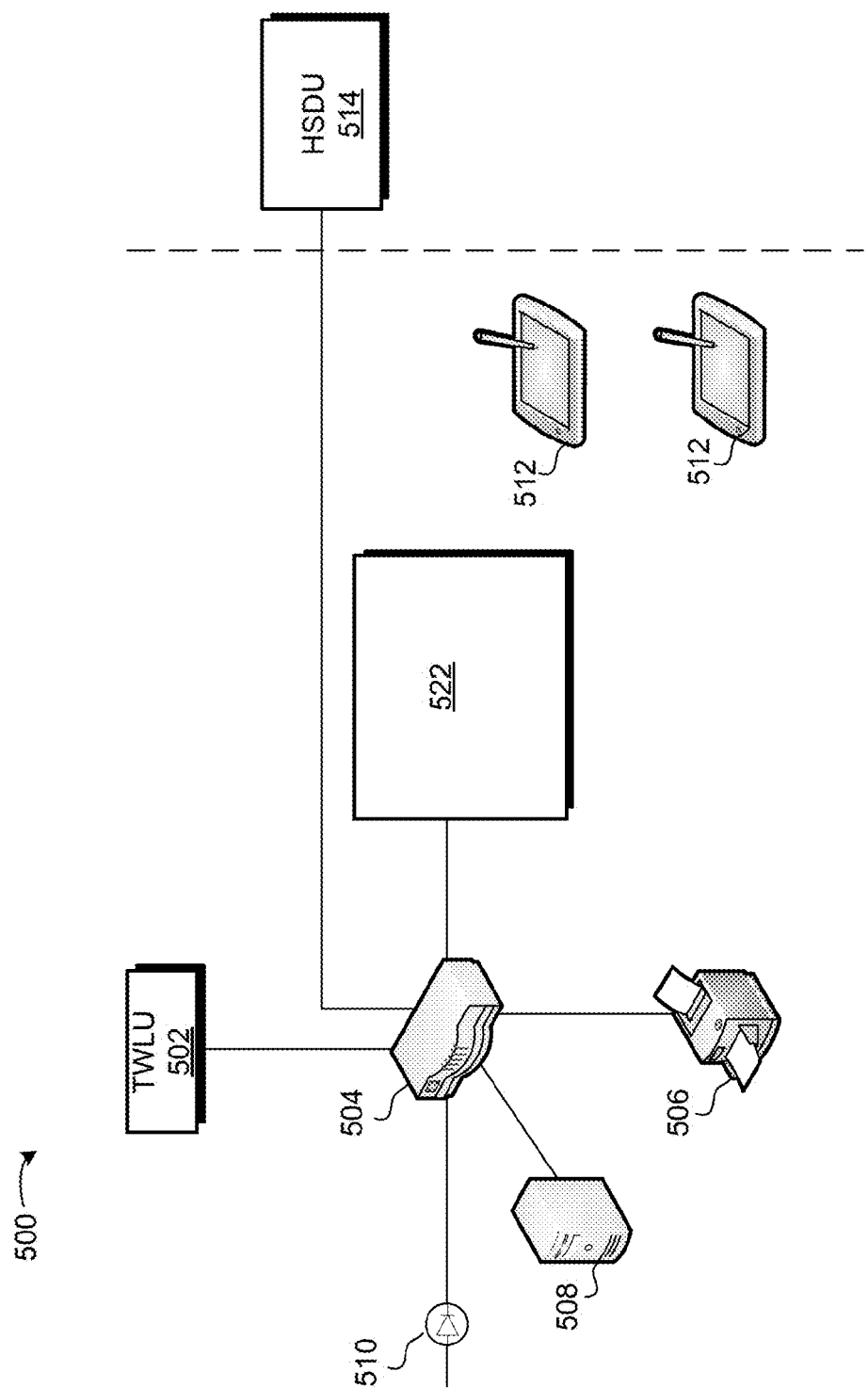
FIG. 5 is a conceptual block diagram corresponding to a first example architecture in a first aircraft type.

FIG. 5 is a conceptual block diagram corresponding to a first example architecture 500 in a first aircraft type. As illustrated, architecture 500 includes a secure aircraft-based mobile device connectivity system (or simply "system" 522), an aircraft router unit (ARU) 504, a printer 506, an aircraft network server unit/airframer (ANSU-AFMR) 508, a security diode (i.e., "open world diode," or "OWD") 510, terminal wireless LAN unit (TWLU) 502, one or more mobile devices (e.g., tablets and the like, as described above) 512, and a high-speed data unit (e.g., an aircraft network architecture high-speed data unit, or "ALNA-HSDU") 514.

In this example, system 522 functions as a wireless access point, associating and wirelessly communicating with mobile devices 512, thereby facilitating data communication between mobile devices 512 and the various components of architecture 500. With respect to the traditional architecture known in the art, system 122 allows one laptop or other computing device to be removed from the standard environment for the first aircraft type, thereby providing modest weight reduction.

Example 2

Figure 6:
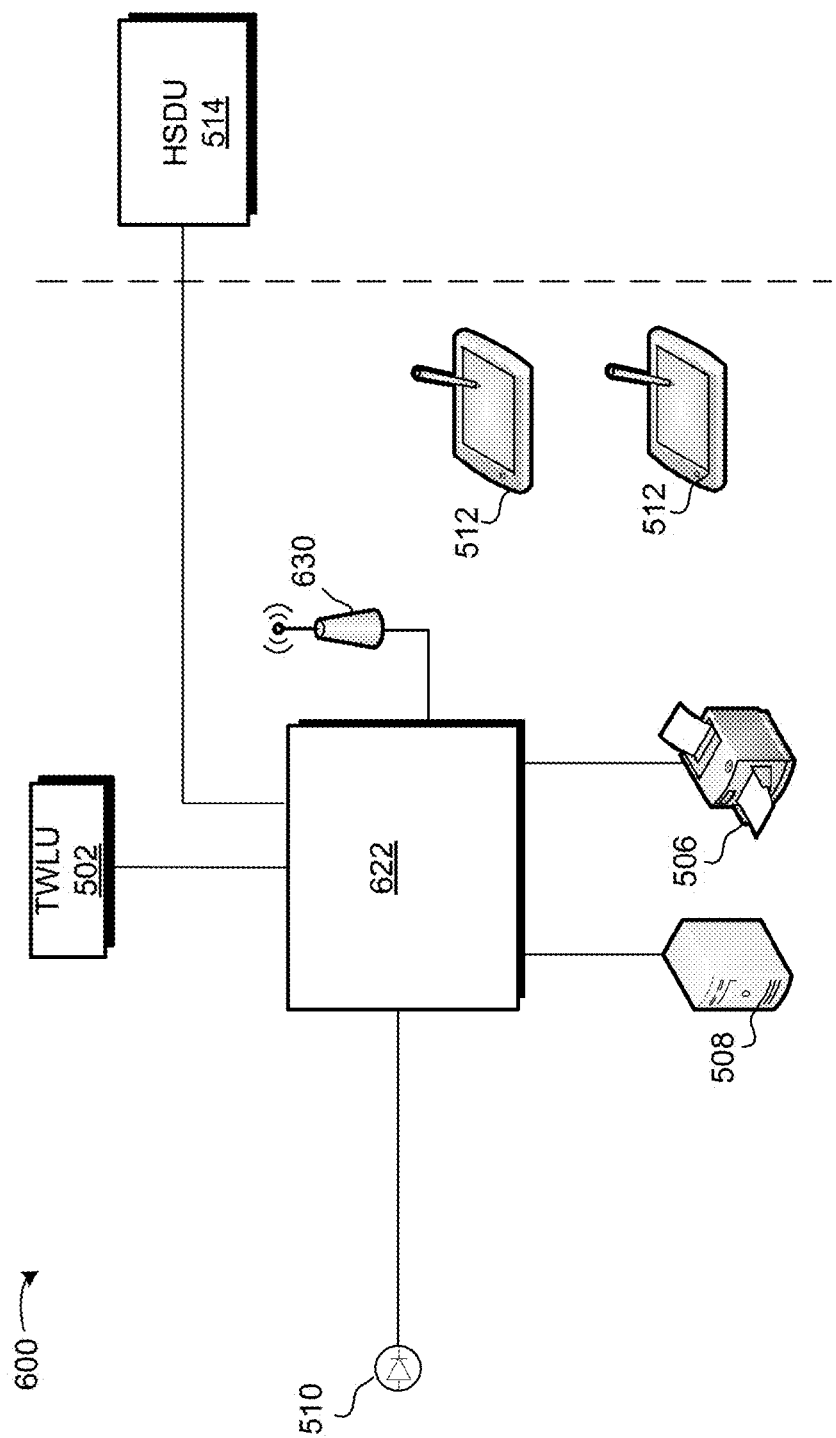
FIG. 6 is a conceptual block diagram corresponding to a second example architecture in a first aircraft type.

FIG. 6 is a conceptual block diagram corresponding to a second example architecture 600 for the first aircraft type. Architecture 600 includes a secure aircraft-based mobile device connectivity system (or simply "system" 622), printer 506, ANSU-AFMR 508, OWD 510, TWLU 502, one or more mobile devices 512, an antenna 630, and ALNA-HSDU 514. In this example, the functionality of ARU 504 (depicted in FIG. 5) has been incorporated into system 622, and an external antenna 630 has been provided. Thus, system 622 essentially acts as a wireless router that can be deployed within the cockpit or within the avionics bay. If system 622 is placed within the avionics bay, antenna 630 is preferably placed within the cockpit and connected to system 622 via, for example, a standard coaxial cable. With respect to the standard architecture and the architecture of example 1, this architecture provides further weight reduction by providing wireless routing, data security functions, and network services within a single component.

Example 3

Figure 7:
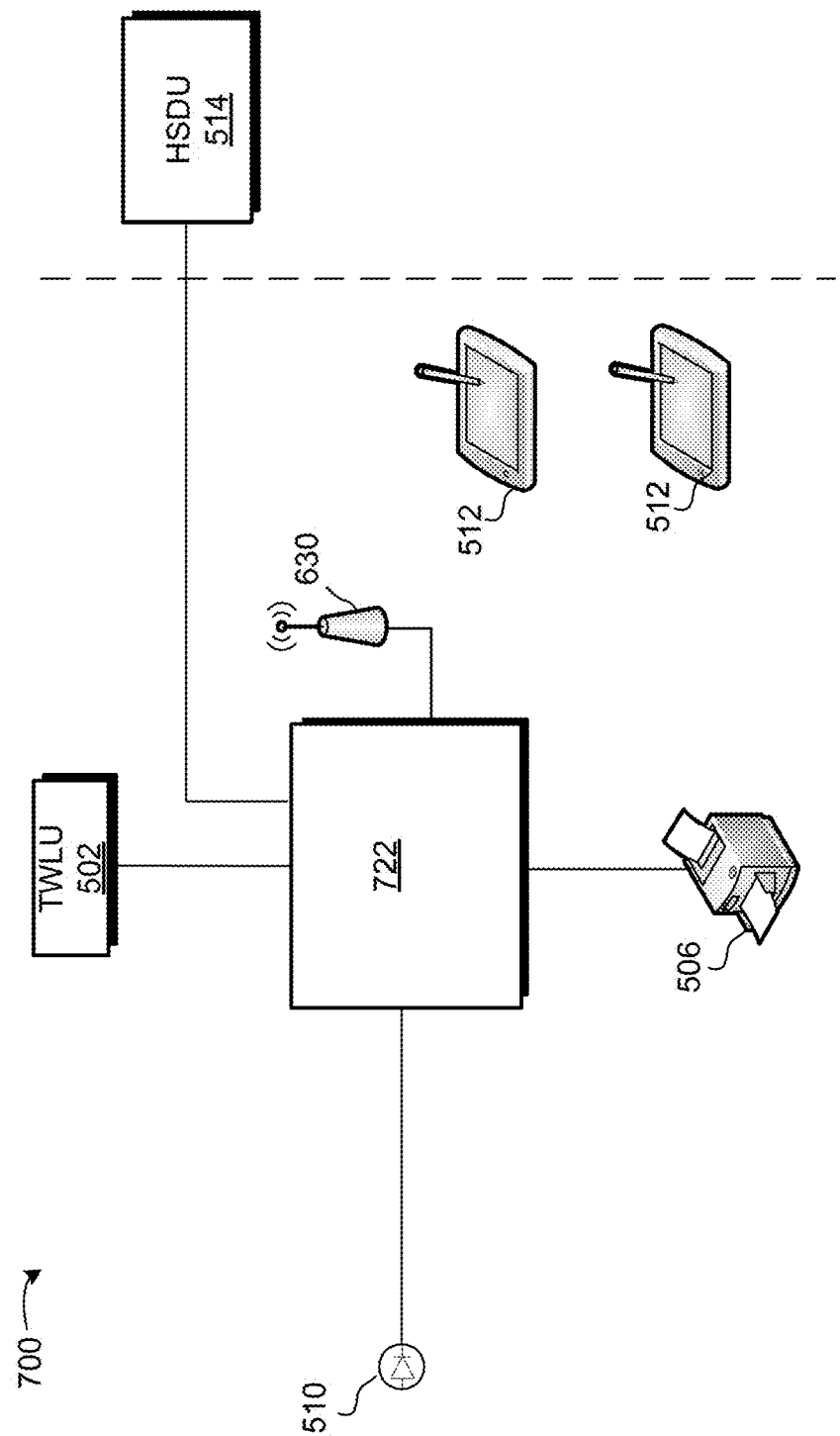
FIG. 7 is a conceptual block diagram corresponding to a third example architecture in a first aircraft type.

FIG. 7 is a conceptual block diagram corresponding to a third example architecture 700 for the first aircraft type. Architecture 700 includes a secure aircraft-based mobile device connectivity system (or simply "system" 722), printer 506, OWD 510, TWLU 502, one or more mobile devices 512, an antenna 630, and ALNA-HSDU 514. In this example, the functionality of the ANSU-AFMR has been incorporated into system 722 such that system 522 effectively functions as a wireless router and server. As with example 2 above, system 722 may be deployed within the cockpit or within the avionics bay, with antenna 630 deployed within the cockpit and suitable connected to system 622. With respect to the standard architecture, this architecture replaces three devices (a laptop, the ARU, and the ANSU) with a single component, thereby providing further weight reduction.

Example 4

Figure 8:
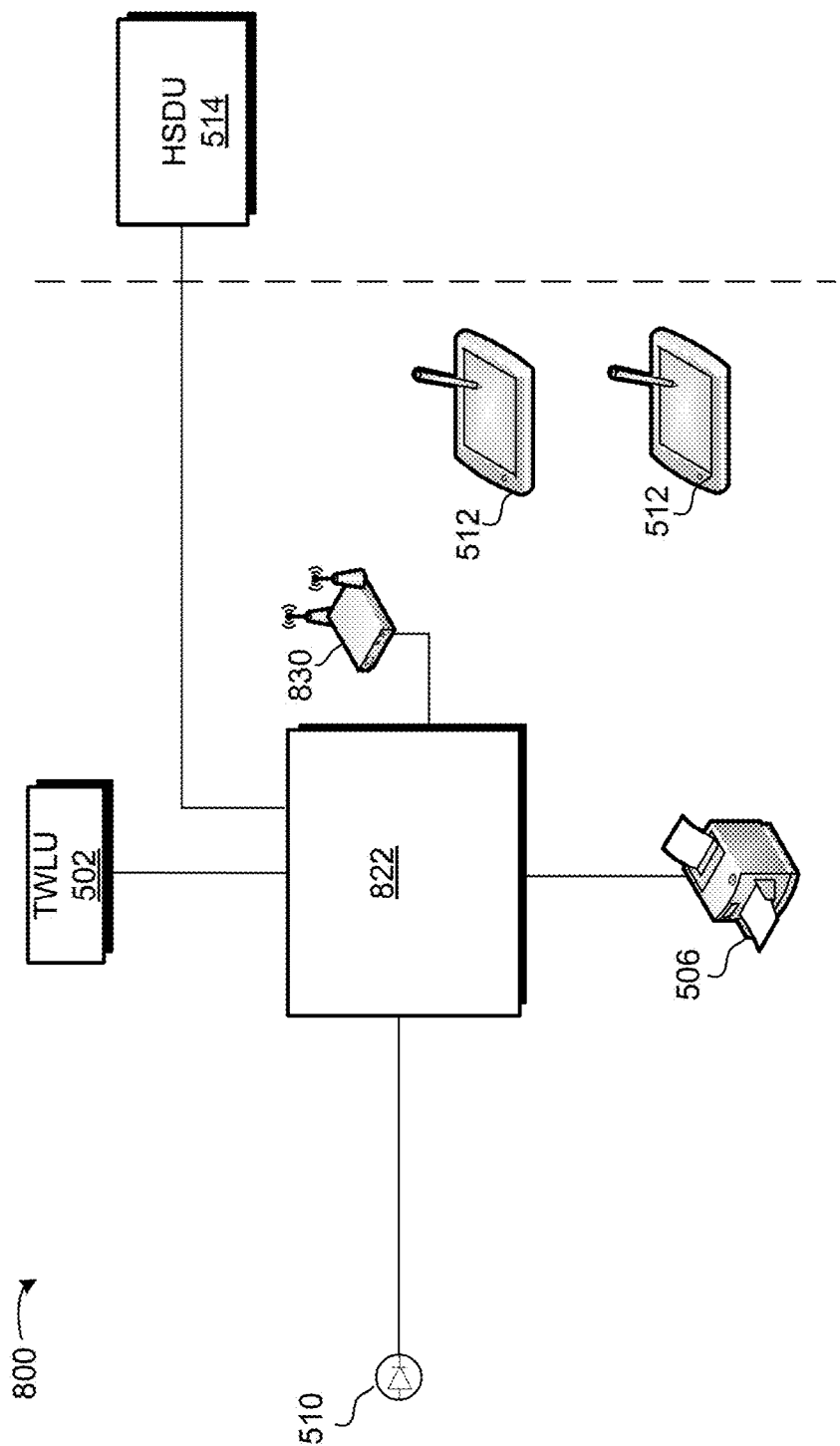
FIG. 8 is a conceptual block diagram corresponding to a fourth example architecture in a first aircraft type.

FIG. 8 is a conceptual block diagram corresponding to a fourth example architecture 800 for the first aircraft type. Architecture 800 includes a secure aircraft-based mobile device connectivity system (or simply "system" 822), printer 506, OWD 510, TWLU 502, one or more mobile devices 512, ALNA-HSDU 514, and an external wireless access point (WAP) 830. That is, with respect to the previous three examples, certain access point functionality has been removed from system 822 in exchange for a stand-alone external WAP. This is advantageous in that it avoids WAP obsolescence. That is, if wireless communication technology advances in some way, rendering WAP 830 obsolete, only WAP 830 need be replaced, rather than replacing all or a portion of system 822.

Example 5

Figure 9:
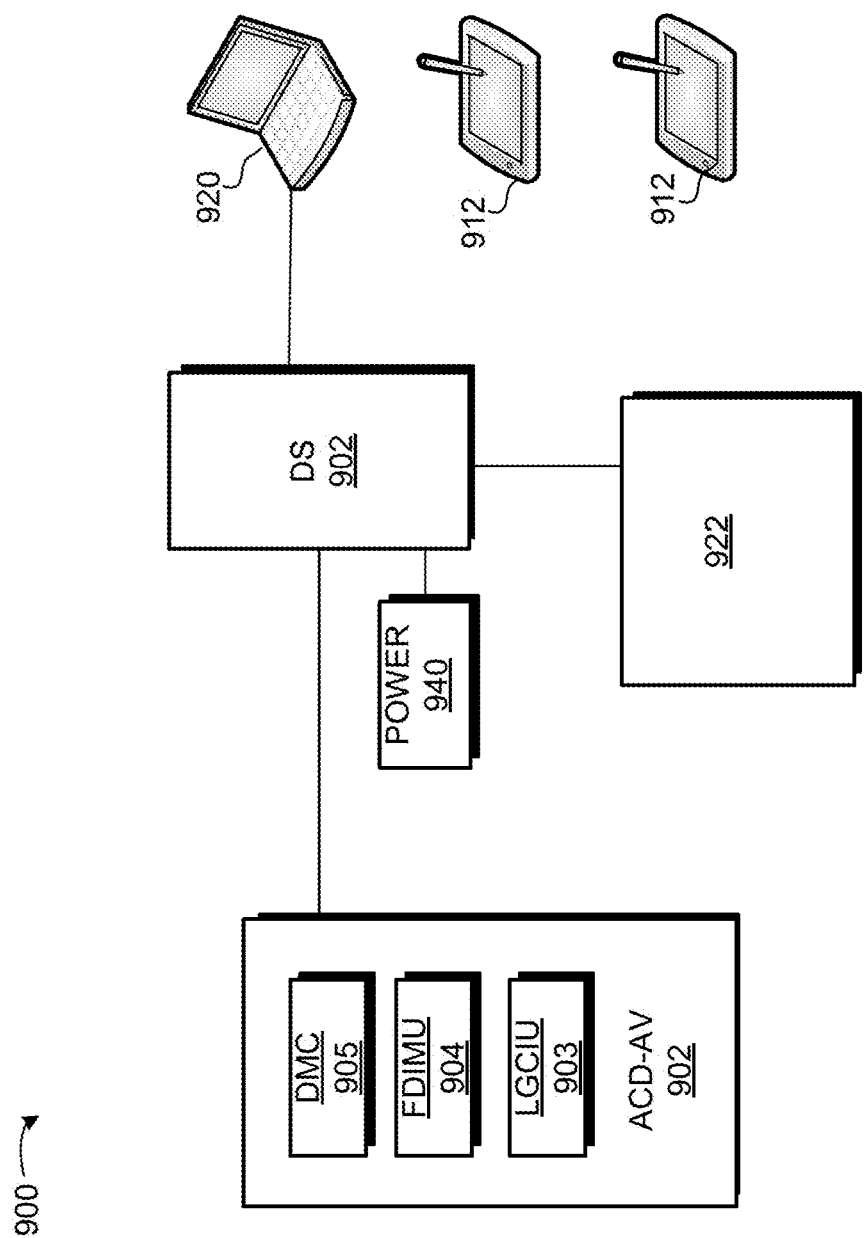
FIG. 9 is a conceptual block diagram corresponding to a first example architecture in a second aircraft type.

FIG. 9 is a conceptual block diagram corresponding to a first example architecture 900 for a second aircraft type. Architecture 900 includes a secure aircraft-based mobile device connectivity system (or simply "system" 922), a data security module 902 connected to a power source 940, a computer (e.g., laptop computer) 920, one or more mobile devices 912, and an aircraft control device (ACD-AV) 902. ACD-AV 902 includes a display management computer (DMC) 905, a flight data interface and management unit (FDIMU) 904, and a landing gear control and interface unit (LGCIU) 903. In this example, system 922 acts as a wireless access point to facilitate data communication with mobile devices 912. Laptop 920 is coupled to DS 902 (via, for example, USB and/or Ethernet) in order to provide network services for mobile devices 912 (e.g., DHCP, routing functions, and the like). Laptop 920 may also be used to provide management of system 922. With respect to the standard architecture for this aircraft type, this architecture eliminates two DUs, one data security module, and one laptop, thereby offering significant weight reduction.

Example 6

Figure 10:
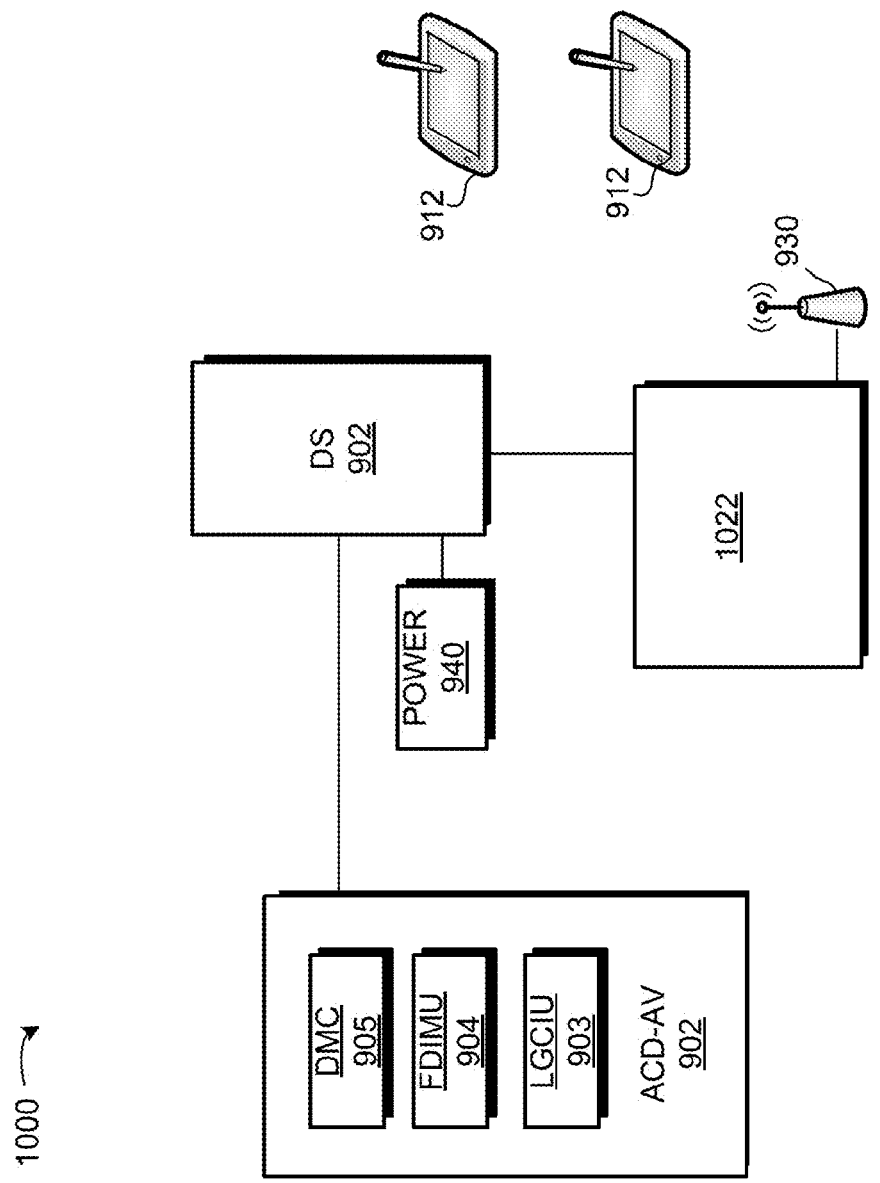
FIG. 10 is a conceptual block diagram corresponding to a second example architecture in a second aircraft type.

FIG. 10 is a conceptual block diagram corresponding to a second example architecture 1000 for the second aircraft type. Architecture 100 includes a secure aircraft-based mobile device connectivity system (or simply "system" 1022), DS 902 connected to a power source 940, one or more mobile devices 912, an antenna 930, and ACD-AV 902, which includes DMC 905, FDIMU 904, and LGCIU 903. With respect to example 5 above, this architecture further reduces weight by incorporating the functionality of one laptop (920 of FIG. 9) into system 1022.

Example 7

Figure 11:
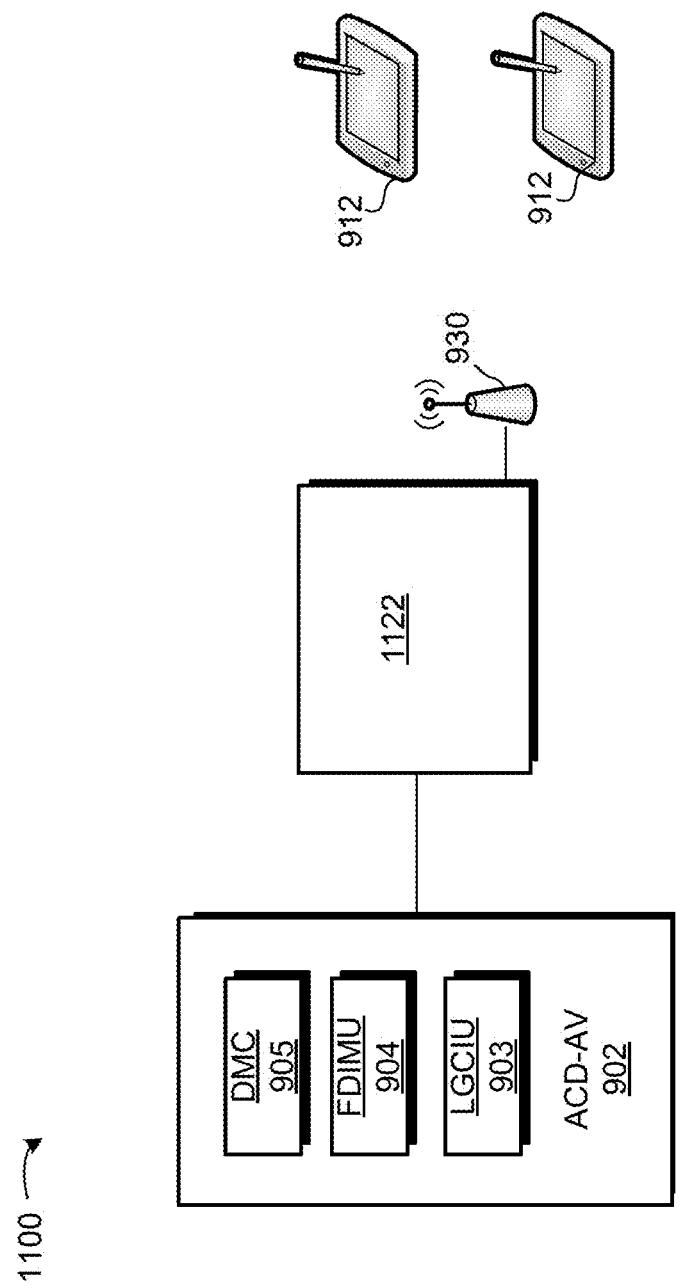
FIG. 11 is a conceptual block diagram corresponding to a third example architecture in a second aircraft type.

FIG. 11 is a conceptual block diagram corresponding to a third example architecture 1100 for the second aircraft type. Architecture 1100 includes a secure aircraft-based mobile device connectivity system (or simply "system" 1122), one or more mobile devices 912, an antenna 930, and ACD-AV 902, which includes DMC 905, FDIMU 904, and LGCIU 903. With respect to example 6 above, this architecture provides further simplification and weight reduction by incorporating the data security functionality of DS 902 into system 1122. Thus, nearly all components of the standard architecture for this aircraft type (two DUs, two DSs, and two laptops) have been incorporated into system 1122.

Example 8

Figure 12:
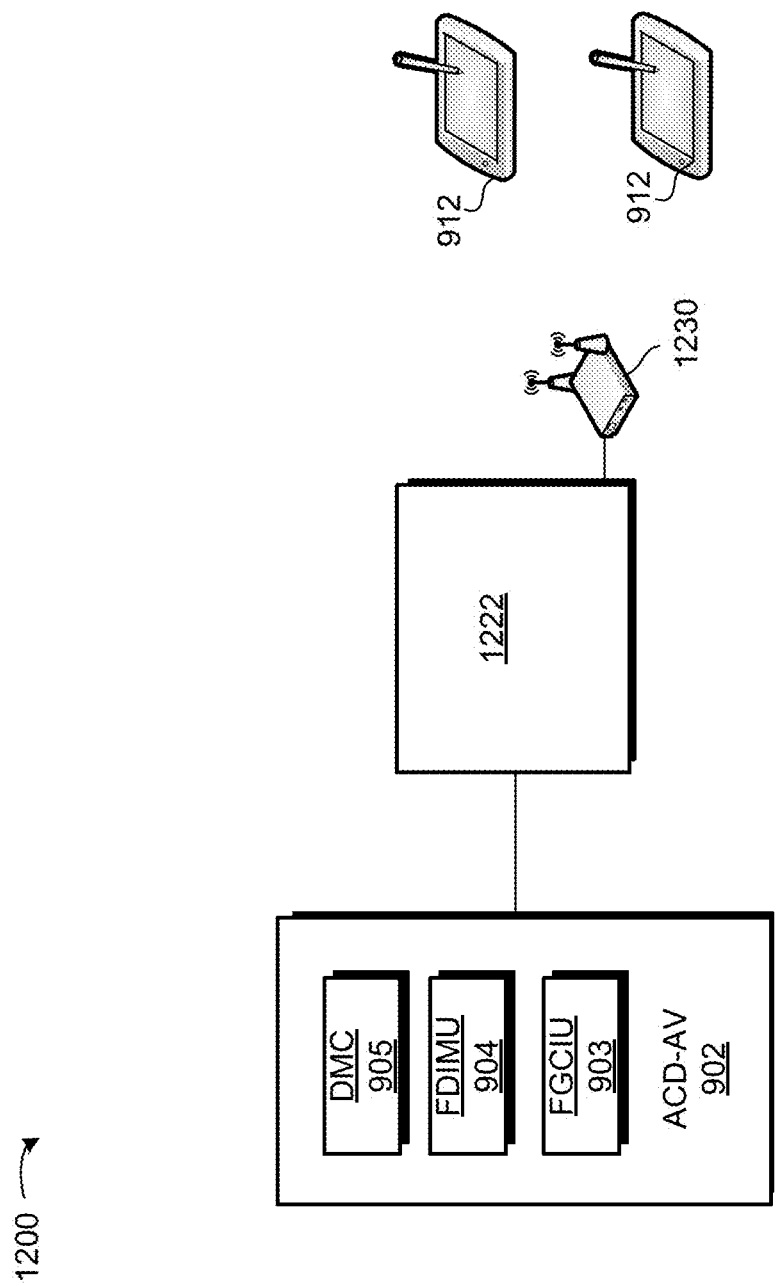
FIG. 12 is a conceptual block diagram corresponding to a fourth example architecture in a second aircraft type.

FIG. 12 is a conceptual block diagram corresponding to a fourth example architecture for the second aircraft type. Architecture 1200 includes a secure aircraft-based mobile device connectivity system (or simply "system" 1222), one or more mobile devices 912, wireless access point (WAP) 1230, and ACD-AV 902, which includes DMC 905, FDIMU 904, and LGCIU 903. With respect to example 7 above, this architecture utilizes an external WAP rather than incorporating that functionality into system 1222 and antenna 930. As described above in connection with example 4 above, this embodiment is advantageous in that it avoids WAP obsolescence. If wireless communication technology advances in some way, rendering WAP 1230 obsolete, only WAP 1230 need be replaced, rather than replacing all or a portion of system 1222.

Data Security Levels

Figure 13:
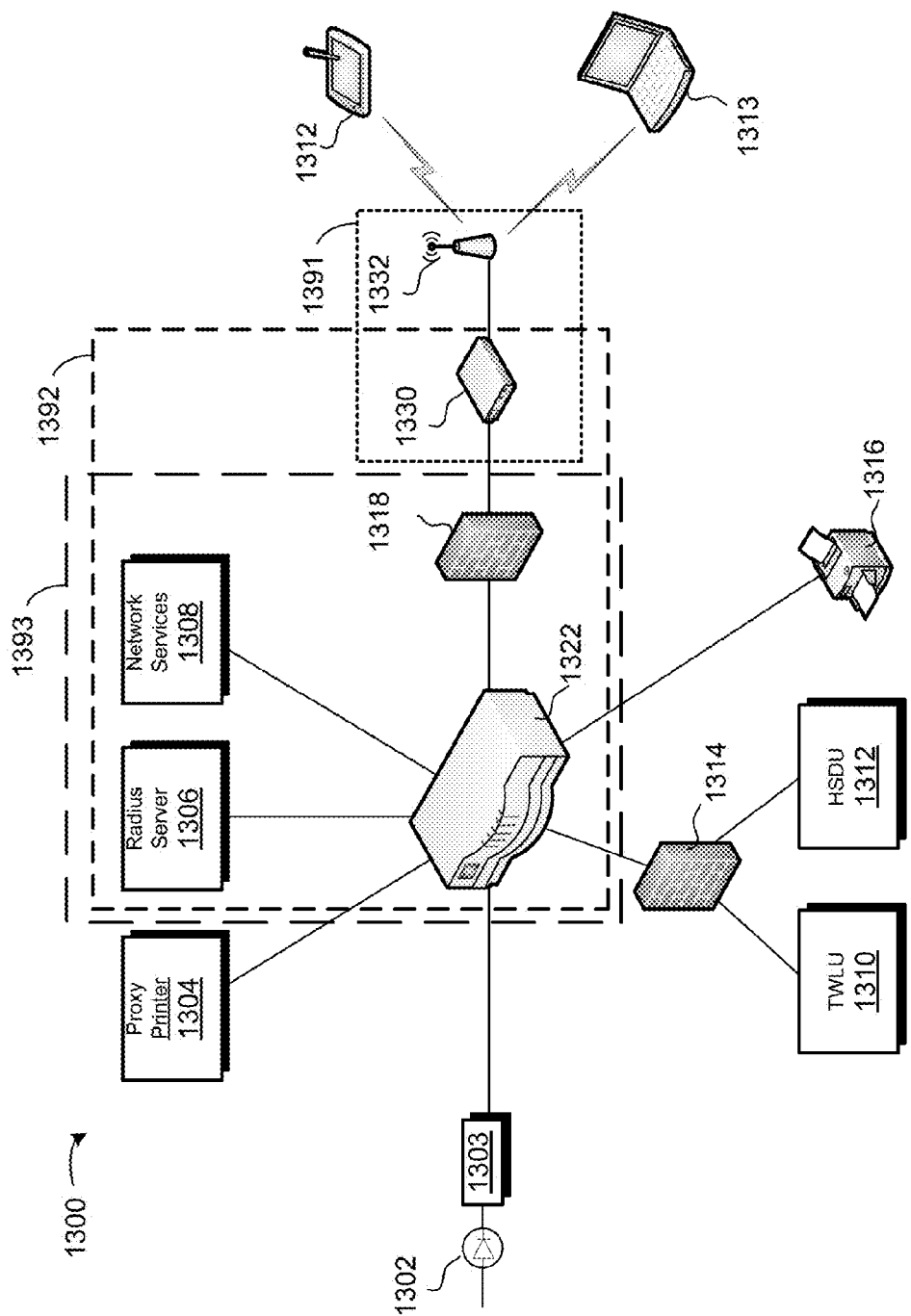
FIG. 13 is a conceptual block diagram depicting various security measures applicable to the various example architectures in a first aircraft type.
Figure 14:
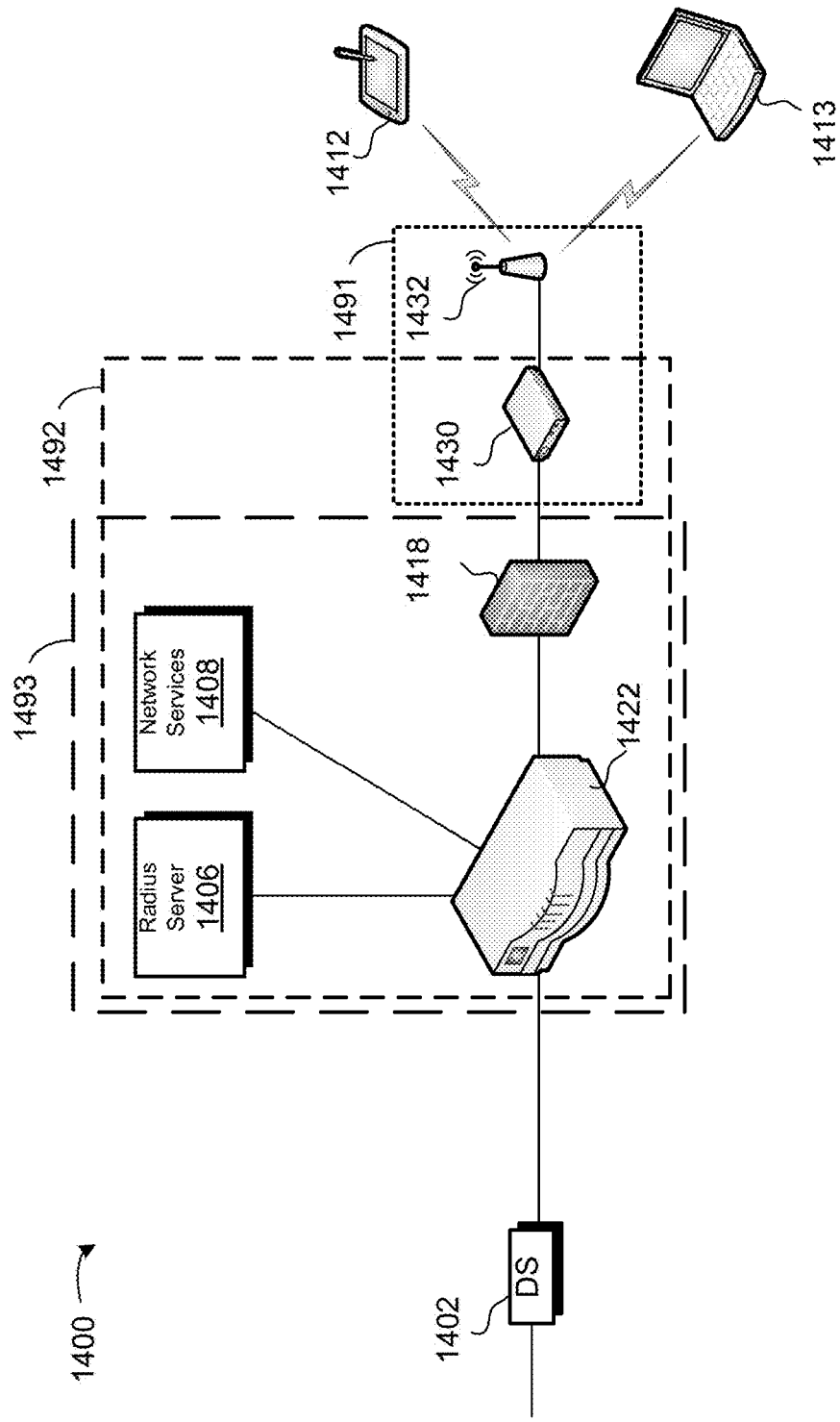
FIG. 14 is a conceptual block diagram depicting various security measures applicable to the various example architectures in a second aircraft type.

It will be apparent that each of the preceding architectures will typically require different security regimes. That is, the security levels required for each of the components and groups of components will vary from architecture to architecture. In that regard, FIG. 13 presents a conceptual block diagram useful in describing security levels for the various examples described above for the first aircraft type, and FIG. 14 presents a conceptual block diagram useful in describing security levels for the various examples presented for the second aircraft type. That is, FIGS. 13 and 14 provide a security-centered, functional view of the architectures described above.

Referring now to FIG. 13, the relevant components of architecture 1300 in the context of an first aircraft type comprise router 1322 coupled to OWD 1302 via an xABCD 1303, a firewall 1314, TWLU 1310, HSDU 1312, printer 1316, proxy printer 1304, server 1306, a network services module 1308, a firewall 1318, an access point 1330 with associated antenna 1332, and one or more mobile devices 1312 and 1313. Firewalls 1314 and 1318, as is known in the art, provide a security filtering function that ensures non-intrusion into the system. Server 1306 is preferably designed for enterprise-class networks (e.g., a RADIUS server as is known in the art). The authentication method provided by server 1306 preferably provides additional security (e.g., against dictionary attached on short passwords). Proxy printer 1304 comprises a client-server application whose function is to relay requests between a client application and a server application. In accordance with the embodiments described herein, proxy printer 1304 relays dataflow from the mobile devices 1312, 1313 to printer 1316 to ensure printer security.

The dotted rectangles in FIG. 13 depict the security measures that are integrated into the secure aircraft-based mobile device connectivity systems described above in examples 1 through 4. In example 1, the mobile device connectivity system incorporates the security functions encompassed by rectangle 1391, i.e., access point 1330 and antenna 1332. Stated another way, the system described in example 1 would preferably incorporate the security functions traditionally provided by an access point and antenna 1332. Such security levels, specified by the relevant standards and protocols, need not be discussed herein.

In example 2, the system incorporates the security functions encompassed by rectangle 1392, i.e., access point 1330, firewall 1318, router 1322, network services 1308, and server 1306. In example 3, the system also incorporates the security functions encompassed by rectangle 1392; however, in example 4, the system incorporates the security functions encompassed by rectangle 1393. That is, example 4 would not include the security measures required for access point 1330.

Referring now to FIG. 14, the relevant components of architecture 1400 in the context of a second aircraft type comprise router 1422 coupled to data security module 1402, server 1406 (e.g., a Radius server as known in the art), a network services module 14038, a firewall 1418, an access point 1430 with associated antenna 1432, and one or more mobile devices 1412 and 1413. In example 5, the system incorporates the security functions encompassed in rectangle 1491, i.e., access point 1430 and antenna 1432. In example 6, the system incorporates the security functions encompassed by rectangle 1492, i.e., access point 1430, firewall 1418, router 1422, network services 1408, and server 1406. In example 7, the system also incorporates the security functions encompassed by rectangle 1492. In example 8, the system incorporates the security functions encompassed by rectangle 1493 (i.e., without access point 1430).

While at least one embodiment has been presented in the foregoing detailed description, it should be appreciated that a vast number of variations exist. It should also be appreciated that the illustrated embodiments are only examples, and are not intended to limit the scope, applicability, or configuration of the present disclosure in any way. Rather, the foregoing detailed description will provide those skilled in the art with a convenient road map for implementing an embodiment, it being understood that various changes may be made in the function and arrangement of elements described in an embodiment without departing from the scope of the present disclosure as set forth in the appended claims and their legal equivalents.

What is claimed is:

1. An aircraft-based mobile device connectivity system comprising:
   a housing structurally separate from and removeably enclosed within the aircraft and coupled via a network receptacle of an aircraft cockpit;
   an avionic systems interface integrated into the housing, the avionic systems interface configured to operate within an ARINC 811 ACD-IS domain and to be communicatively coupled to an avionics system external to the housing;
   a wireless interface integrated into the housing, the wireless interface configured to provide wireless communication with one or more mobile devices;
   at least one avionics module integrated into the housing;
   a data security module located within the housing and configured to operate within an ARINC 811 AISD domain that is segregated from the ACD-IS domain in which the avionic systems interface operates, wherein the avionic systems interface and the data security module execute on separate physical processors of the aircraft-based mobile device connectivity system to thereby physically isolate the ARINC 811 AISD domain from the ARINC 811 ACD-IS domain, the data security module configured to authenticate the one or more mobile devices, to securely process commands received from the one or more mobile devices to request avionics data from the avionics system via the avionic systems interface and the at least one avionics module, to transform the received avionics data into a format that is readable by the one or more mobile devices, and to securely transmit the transformed avionics data to the one or more mobile devices via the wireless interface; and
   a Wireless Airport Communication System (WACS) interface integrated into the housing, the WACS interface configured to be communicatively coupled to a WACS communication module external to the housing, wherein the WACS interface operates outside of the ARINC 811 ASID domain, and wherein the data security module is further configured to request data via the WACS interface in response to the commands received from the one or more mobile devices, to transform the data received via the WACS interface to the format that is readable by the one or more mobile devices, and to forward the transformed data to the one or more mobile devices via the wireless interface.

2. The system of claim 1, further including a wired interface integrated into the housing and operating within the ARINC 811 ASID domain, the wired interface configured to be communicatively coupled to at least one storage device external to the housing.

3. The system of claim 1, wherein the at least one avionics module is configured to provide at least one of WACS health monitoring, customization functions, and administration functions to the data security module as the avionics data requested by the data security module in response to the commands received from the one or more mobile devices.

4. A method executable by a device structurally separate from and removeably enclosed within an aircraft and coupled via a network receptacle of an aircraft cockpit to provide mobile device connectivity to one or more mobile devices operating within the aircraft, the device comprising a wireless interface, an avionic systems interface, a data security module, and a Wireless Airport Communication System (WACS) interface, the method comprising:
   operating the avionic systems interface, wherein the avionic systems interface is communicatively coupled to an avionics system external to the device and is within an ARINC 811 ACD-IS domain of the aircraft;
   authenticating, by the data security module, the one or more mobile devices operating within the aircraft, wherein the data security module is operating within an ARINC 811 AISD domain that is segregated from the ACD-IS domain that the avionic systems interface operates, wherein the avionic systems interface and the data security module execute on separate physical processors of the device to thereby physically isolate the ARINC 811 AISD domain from the ARINC 811 ACD-IS domain;
   securely receiving and processing, via the wireless interface, commands received from the one or more mobile devices one or more mobile devices;
   requesting and receiving, by the data security module, avionics data via the avionic systems interface and via the WACS interface, responsive to the commands received via the wireless interface from the one or more mobile devices, wherein the WACS interface is communicatively coupled to a WACS communication module external to the device, wherein the WACS interface operates outside of the ARINC 811 ASID domain;
   transforming, via the WACS interface, the avionics data received via the avionic systems interface into a format that is readable by the one or more mobile devices; and
   securely transmitting the transformed avionics data to the one or more mobile devices via the wireless interface.

5. The method of claim 4, further including the data security module communicating via a wired interface with at least one at least one storage device operating within the ARINC 811 ASID domain external to the data security module.

6. An aircraft-based mobile device connectivity system comprising:
   an aircraft;
   a housing structurally separate from and removeably enclosed within the aircraft and coupled via a network receptacle of an aircraft cockpit;
   an avionic systems interface integrated into the housing, the avionic systems interface configured to operate within an ARINC 811 ACD-IS domain and to be communicatively coupled to an avionics system external to the housing;
   a wireless interface integrated into the housing, the wireless interface configured to provide wireless communication with one or more mobile devices;
   at least one avionics module integrated into the housing;
   a data security module located within the housing and configured to operate within an ARINC 811 AISD domain that is segregated from the ACD-IS domain in which the avionic systems interface operates, wherein the avionic systems interface and the data security module execute on separate physical processors of the aircraft-based mobile device connectivity system to thereby physically isolate the ARINC 811 AISD domain from the ARINC 811 ACD-IS domain, the data security module configured to authenticate the one or more mobile devices, to securely process commands received from the one or more mobile devices to request avionics data from the avionics system via the avionic systems interface and the at least one avionics module, to transform the received avionics data into a format that is readable by the one or more mobile devices, and to securely transmit the transformed avionics data to the one or more mobile devices via the wireless interface; and a Wireless Airport Communication System (WACS) interface integrated into the housing, the WACS interface configured to be communicatively coupled to a WACS communication module external to the housing, wherein the WACS interface operates outside of the ARINC 811 ASID domain, and wherein the data security module is further configured to request data via the WACS interface in response to the commands received from the one or more mobile devices, to transform the data received via the WACS interface to the format that is readable by the one or more mobile devices, and to forward the transformed data to the one or more mobile devices via the wireless interface.

\* \* \* \* \*